United States Patent
Hassan et al.

(10) Patent No.: US 10,020,838 B2
(45) Date of Patent: Jul. 10, 2018

(54) SEQUENCE GENERATION FOR SPREAD SPECTRUM FROM SIGNAL SAMPLING

(71) Applicant: Microsoft Technology Licensing, LLC, Redmond, WA (US)

(72) Inventors: Amer Hassan, Kirkland, WA (US); Edward Giaimo, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/275,176

(22) Filed: Sep. 23, 2016

(65) Prior Publication Data

US 2018/0091188 A1    Mar. 29, 2018

(51) Int. Cl.
*H04B 1/707* (2011.01)

(52) U.S. Cl.
CPC .................................. *H04B 1/707* (2013.01)

(58) Field of Classification Search
CPC .. H04B 1/707; H04B 1/70718; H04B 1/7073; H04B 1/70735; H04B 1/7075; H04B 1/70751; H04B 1/70752; H04B 1/70753; H04B 1/70754; H04B 1/70757
USPC ....... 375/140, 142, 143, 145, 147, 149, 150, 375/152, 316
See application file for complete search history.

(56) References Cited

U.S. PATENT DOCUMENTS

| | | | | | |
|---|---|---|---|---|---|
| 5,120,997 A | * | 6/1992 | Cantwell | ................ | H04B 1/707 327/50 |
| 5,852,630 A | * | 12/1998 | Langberg | ............ | H04L 27/2647 375/219 |
| 5,910,948 A | * | 6/1999 | Shou | ................... | H04B 1/70735 370/331 |
| 5,995,533 A | * | 11/1999 | Hassan | ................... | H04J 13/00 375/140 |

(Continued)

FOREIGN PATENT DOCUMENTS

| | | |
|---|---|---|
| EP | 2178231 A1 | 4/2010 |
| WO | 9623376 A2 | 8/1996 |
| WO | 2015144256 A1 | 10/2015 |

OTHER PUBLICATIONS

Maes, et al., "PUFKY: A Fully Functional PUF-based Cryptographic Key Generator", In Proceedings of the 14th International conference on Cryptographic Hardware and Embedded Systems, Sep. 9, 2012, 18 pages.

(Continued)

*Primary Examiner* — Siu Lee (57) ABSTRACT

A method for generating spread spectrum spreading sequences in communicating devices. A first device receives a first sequence of one or more signals from a second device, sends a second sequence of one or more signals to the second device, samples the first sequence of one or more signals, generates sampling results, and generates a spreading sequence based on the sampling results. The second device receives the second sequence and creates an identical spreading sequence using an identical process to create (Continued)

sampling results and generate the sequence. The spreading sequence may be used by the first and second devices for spread spectrum communications with each other. Gain for spread spectrum communications may be dynamically varied based on available bandwidth by varying the number of signals and sampling rate.

18 Claims, 5 Drawing Sheets

(56) References Cited

U.S. PATENT DOCUMENTS

| | | | | |
|---|---|---|---|---|
| 6,128,288 | A * | 10/2000 | Miya | H04B 1/707 370/335 |
| 6,560,271 | B1 * | 5/2003 | Han | H04B 1/7075 375/136 |
| 7,873,097 | B1 | 1/2011 | Luecke et al. | |
| 7,921,282 | B1 | 4/2011 | Mukerji et al. | |
| 8,300,675 | B2 * | 10/2012 | Kerr | H04B 1/7075 375/140 |
| 8,643,475 | B1 | 2/2014 | Kohno et al. | |
| 2002/0172180 | A1 | 11/2002 | Hall et al. | |
| 2009/0015385 | A1 | 1/2009 | Teuwen et al. | |
| 2012/0128157 | A1 | 5/2012 | Braun | |
| 2013/0077789 | A1 | 3/2013 | Tahan et al. | |
| 2013/0114643 | A1 * | 5/2013 | Shope | H04B 1/707 375/142 |
| 2015/0089588 | A1 | 3/2015 | Du et al. | |
| 2016/0302074 | A1 * | 10/2016 | Hekstra | H04L 9/00 |

OTHER PUBLICATIONS

Chae, et al., "Maximalist Cryptography and Computation on the WISP UHF RFID Tag", In Publication of Springer, Feb. 21, 2013, 12 pages.

Barker, et al., "Recommendation for Cryptographic Key Generation", In NIST Special Publication 800-133, Dec. 2012, 26 pages.

"International Search Report and Written Opinion Issued in PCT Application No. PCT/US2017/051681", dated Dec. 1, 2017, 11 Pages.

* cited by examiner

SEQUENCE GENERATION FOR SPREAD SPECTRUM FROM SIGNAL SAMPLING

BACKGROUND

Telecommunications systems currently use various types of spread spectrum technology for transmitting and receiving data. Commonly used forms of spread spectrum include frequency-hopping spread spectrum (FHSS), direct-sequence spread spectrum (DSSS), time-hopping spread spectrum (THSS), and ultra-wideband (UWB) spread spectrum. Each of these techniques may use pseudorandom number sequences created using pseudorandom number generators to determine and control the spreading pattern of a signal across allocated bandwidth.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure include systems, devices, and methods for generating sequences for spreading data signals sent between communicating devices. In example implementations, sequences may be dynamically generated in each of two communicating devices according to selected spreading parameters such as bandwidth spreading factor or gain. The selected parameters may be determined based on the amount of communication resources, such as bandwidth, that are available to the devices. When the spreading parameters are determined, the sequences may be determined by a process that uses information that is known only to the two communicating devices. The implementations utilize the fact that a channel comprising communication links that are on the same frequency and opposite in direction between two devices shows reciprocity by exhibiting the same channel characteristics at each device. Information used to generate the sequence in each device may be based on these reciprocal channel characteristics. Only the two devices may determine these channel characteristics and the channel characteristics will be known only to the two devices.

The embodiments include an implementation in a first device. The first device may be configured to receive a first sequence of one or more signals from a second device, send a second sequence of one or more signals to the second device, sample the first sequence of one or more signals, generate sampling results, create a spreading sequence based on the sampling results, and utilize the spreading sequence to exchange spread spectrum data signals with the second device. The second sequence of signals may be identical to the first sequence of signals and the second device may receive the second sequence and create a spreading sequence in an identical manner by using the same sampling process on the second sequence of signals. Use of identical sequences of signals as the first and second sequences of signals allows the first device to create a spreading sequence that is identical to the spreading sequence created in the second device with which it is communicating. The number of signals in the first and second sequence of signals and the rate of sampling of the signals in the first and second sequence of signals may be determined by an available bandwidth. By varying the number of signals and rate of sampling, different spreading sequences with different characteristics and different lengths may be generated. The spreading sequence may then be used to spread/de-spread data signals exchanged with the second device. In one example implementation, the spreading sequence may be used for directly spreading and/or de-spreading a data signal using direct-sequence spread spectrum (DSSS) techniques. In another example implementation, sets of bits of the spreading sequence may be used to generate a channel list in the first and second devices that is used to implement frequency-hopping spread spectrum (FHSS). Other example implementations may include using the spreading sequence to generate spread spectrum signals in time-hopping spread spectrum (THSS), or ultra-wideband (UWB) spread spectrum.

In further implementations, the first device may sample the sequence of one or more signals received from the second device at each of a plurality of time intervals and create a plurality of samples. Each of the plurality of samples may be a set of bits indicating a magnitude of a sampled power level. The first device may generate sampling results from the plurality of samples by taking only selected sets of the plurality of samples having a magnitude above a threshold power magnitude. In an example implementation, the threshold power magnitude may be set at the median magnitude of the plurality of samples. The first device may then generate the spreading sequence by using all or a portion of the sampling results as the spreading sequence. The first device may test the generated spreading sequence for conformance to a metric, such as a randomness metric, before using the sequence to process a data signal. If the generated spreading sequence does not conform to the metric, the first device may initiate a restart of the sequence generation process between the first and second devices, or may apply a permutation vector to the sequence, and retest the sequence for conformance to the metric before using the spreading sequence to process the data signal. If the first device applies a permutation vector to the sequence, the first device may send an indication to the second device so the second device may also apply the same permutation vector.

Example implementations also include a network that includes a first device and a second device each configured to implement spreading sequence generation according to the embodiments. The first device may comprise a mobile device and the second device may comprise a device or apparatus in the network infrastructure. In an alternative, the first and second devices may each be a mobile device configured to communicate with other mobile devices.

DETAILED DESCRIPTION

The system, devices, and methods will now be described by use of example embodiments. The example embodiments are presented in this disclosure for illustrative purposes, and not intended to be restrictive or limiting on the scope of the disclosure or the claims presented herein.

The disclosed embodiments provide a technical advantage in that two devices may dynamically generate spreading sequences for communications between the two devices based on changing radio frequency (RF) environment conditions. An advantage is also provided in that the spreading sequences or spreading sequence related information need not be provided to, exchanged by, or stored on, any of the devices prior to generating the spreading sequences. The spreading sequences may therefore be only known to the two devices. As compared to methods that require use of a set of predefined spreading sequences, the embodiments allow devices to flexibly generate a wider range of spreading sequences that may be more easily adapted for radio environment conditions. Also, as compared to methods in which devices rely on use of a predefined set of sequences, the embodiments provide more secure communications since the spreading sequences are not known to potential eavesdroppers or interceptors.

The embodiments utilize the fact that a channel comprising communication links that are on the same frequency and opposite in direction between two devices shows reciprocity by exhibiting the same unique channel characteristics at each device. In order to maintain reciprocity of the channel during sequence generation, the time window within which the sequence generation occurs at each of the two devices may be relatively short. In an example implementation, time windows on the order of less than 1 millisecond may be used. Sequences used to spread signals between the two devices may be based on these reciprocal unique channel characteristics. The unique channel characteristics may be determined at each of the two devices by sampling a sequence of one or more RF signals. The sequence of one or more RF signals sampled at each device may comprise identical RF signals sent from the other of the two devices. Also, the sampling may be performed in each device in an identical manner. The sampling results will then reflect the channel characteristics and be identical or nearly identical. The sampling results may be used to generate a spreading sequence in each device. The embodiments allow each of the two devices to create identical spreading sequences in both devices, where the spreading sequence is based on the reciprocal unique channel characteristics determined by and known only to each of the two devices. The identical spreading sequences may then be used to de-spread and spread data signals sent between the two devices.

The embodiments may be adapted for use in different types of spread spectrum systems to allow flexible adaption of spreading sequences based on the RF environment in which two communicating devices operate. For example, the number of signals in the sequence of RF signals sent from each device to the other device, and the sampling rate of the RF signals, may be dynamically varied depending on available bandwidth and system constraints. When available bandwidth increases, the number of signals and/or sampling rate may be increased to generate longer spreading sequences that provide higher spreading gain and increased performance. When available bandwidth decreases, the number of signals and/or sampling rate may be decreased to generate shorter spreading sequences that provide a lower spreading gain to conform to network bandwidth requirements. The various parameters related to the spreading sequence generation may be set according to network constraints and network configuration. For example, the frequencies used for exchange of the sequences of the RF signals will depend on the network frequencies that the devices are allowed to use. Also, the number of RF signals in the sequence of RF signals, the rate of the sampling performed on the RF signals, the number of bits per sample, and the number of bits in the generated spreading sequence may each be adapted to provide spreading sequences appropriate for use in a particular network.

Additionally, because the unique channel characteristics are based on the conditions of the channel between the two devices at the time of sequence generation, the unique channel characteristics may be only known to each of the two devices on that channel. Only the two devices may determine these channel characteristics. A third device that attempts to intercept communications will not have knowledge of the spreading sequences. Neither will the third device be able to determine the sequences by determining the sequences from the unique channel characteristics of the channel, which by the nature of the channel can be known only to each of the two communicating devices that communicate on that channel. The embodiments also provide an advantage in that the spreading sequences generated in each of two devices may be updated as appropriate to provide additional security. Because the spreading sequences are generated based on the characteristics of the channel between the two devices at the time of spreading sequence generation, each time new spreading sequences are generated the spreading sequences will be based on different channel characteristics. Each generated sequence will be different from previously generated spreading sequences.

Example implementations of the embodiments also provide advantages in that the implementations may be used in networks or systems having devices with low quality reception or transmission capability. In these situations, one or both of the two communicating devices may not be capable of precisely sampling the sequence of one or more RF signals to determine the unique channel characteristics of a channel between the two devices. In these cases, one or more bit errors may exist in the sampling results on the sequence of RF signals in one or both of the devices. In this case the sampling results may not be identical in both devices. If the spreading sequences were created using all bits of the sampling results, the spreading sequences may not be identical in the two devices. Implementations of the embodiments may be used in order to make the spreading sequence generation process more reliable and robust when one or both of the devices are such that the sampling results may not be identical in both devices. In one implementation, sets of bits each representing one or more most significant bits (MSBs) from each of the sampling results may be used to generate the spreading sequences. The use of the MSBs allows bit errors and discrepancies between the sampling results in the two devices to be removed. This helps ensure that the same spreading sequence is created in both devices.

The embodiments have application to provide dynamic and secure spread spectrum communications in systems in which pseudo-random sequences may be used in creating a spread spectrum signal. For example, implementations may be used in systems using frequency-hopping spread spectrum (FHSS), direct-sequence spread spectrum (DSSS), time-hopping spread spectrum (THSS), ultra-wideband (UWB) spread spectrum, and combinations of these spread spectrum techniques. In one example, the embodiments have application in systems such as those operating according to the IEEE 802.11 Wi-Fi standards in which a device may communicate data with an access point of a network using DSSS. In this case, the spreading sequence may be used to directly spread a data signal. The embodiments also have application to other standardized or proprietary networks having channels configured to use spreading sequences such as cellular/communications networks using code division multiple access (CDMA) or wide band CDMA (WCDMA).

Figure 1A:
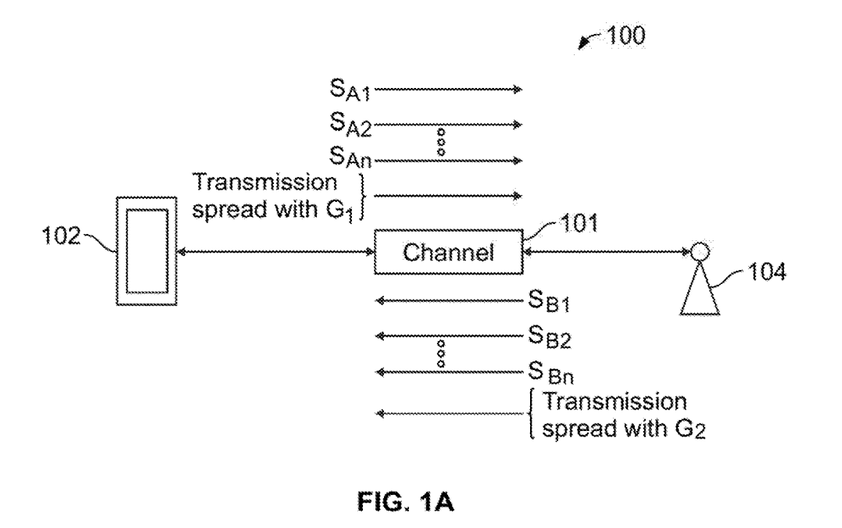
FIG. 1A is a simplified diagram illustrating an example network into which an embodiment of the disclosure may be implemented.

Referring now to FIG. 1A, therein is a simplified diagram illustrating an example network 100 into which an embodiment of the disclosure may be implemented. FIG. 1A shows device 102 communicating with device 104 over channels 101. Device 102 may be a mobile device operating in the coverage area of network 100 and device 104 may be an access point of network 100. Channels 101 may comprise at least one frequency channel that may be used by both device 102 and device 104 for exchanging communications with each other. In an example implementation of Network 100, device 102 and device 104 may be configured to operate using spread spectrum according to the IEEE 802.11 standards. In other implementations, device 102 and device 104 may operate according to other wireless spread spectrum specifications that allow spread spectrum sequences to be generated in communicating devices according to the embodiments. While devices 102 and 104 are described, respectively, as a mobile device and access point in one implementation of FIG. 1A, in other implementations of the embodiments, devices 102 and 104 may be any types of devices that communicate between each other using spread spectrum techniques.

Figure 1B:
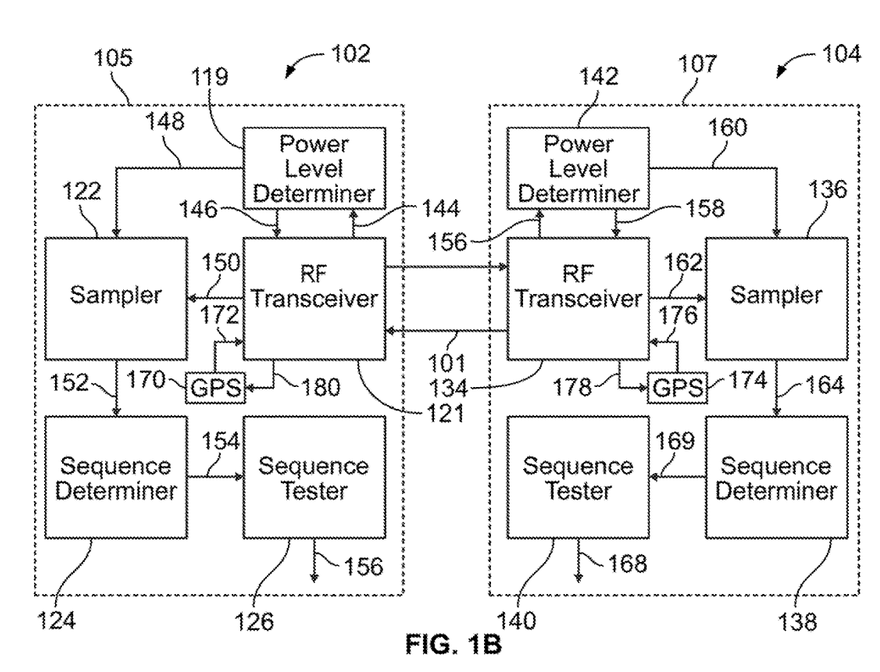
FIG. 1B is a simplified block diagram illustrating portions of example devices.

FIG. 1B is a simplified block diagram illustrating example portions of devices 102 and 104 in an implementation of FIG. 1A. Device 102 includes a portion 105 that includes RF transceiver 121, sampler 122, power level determiner 119, GPS function 170, sequence determiner 124, and sequence tester 126. Device 104 includes a portion 107 that includes RF transceiver 134, sampler 136, power level determiner 142, GPS function 174, sequence determiner 138, and sequence tester 140. Portion 105 communicates with other functions on device 102 to provide spread spectrum sequences at output 156 that may be used to spread and de-spread signals exchanged with device 104. Portion 107 communicates with other functions on device 104 to provide spread spectrum sequences at output 168 that may be used to spread and de-spread signals exchanged with device 102. Device 102 and 104 may each include one or more processors, circuitry, and/or code comprising programs for implementing, respectively, the functions shown in portions 105 and 107. The functions shown in portions 105 and 107 of devices 102 and 104 may be separately configured on each device, or may be configured as combined, in whole or in part, with processors, circuitry, and/or code or programs that are also utilized for other functions of the devices.

Figure 2:
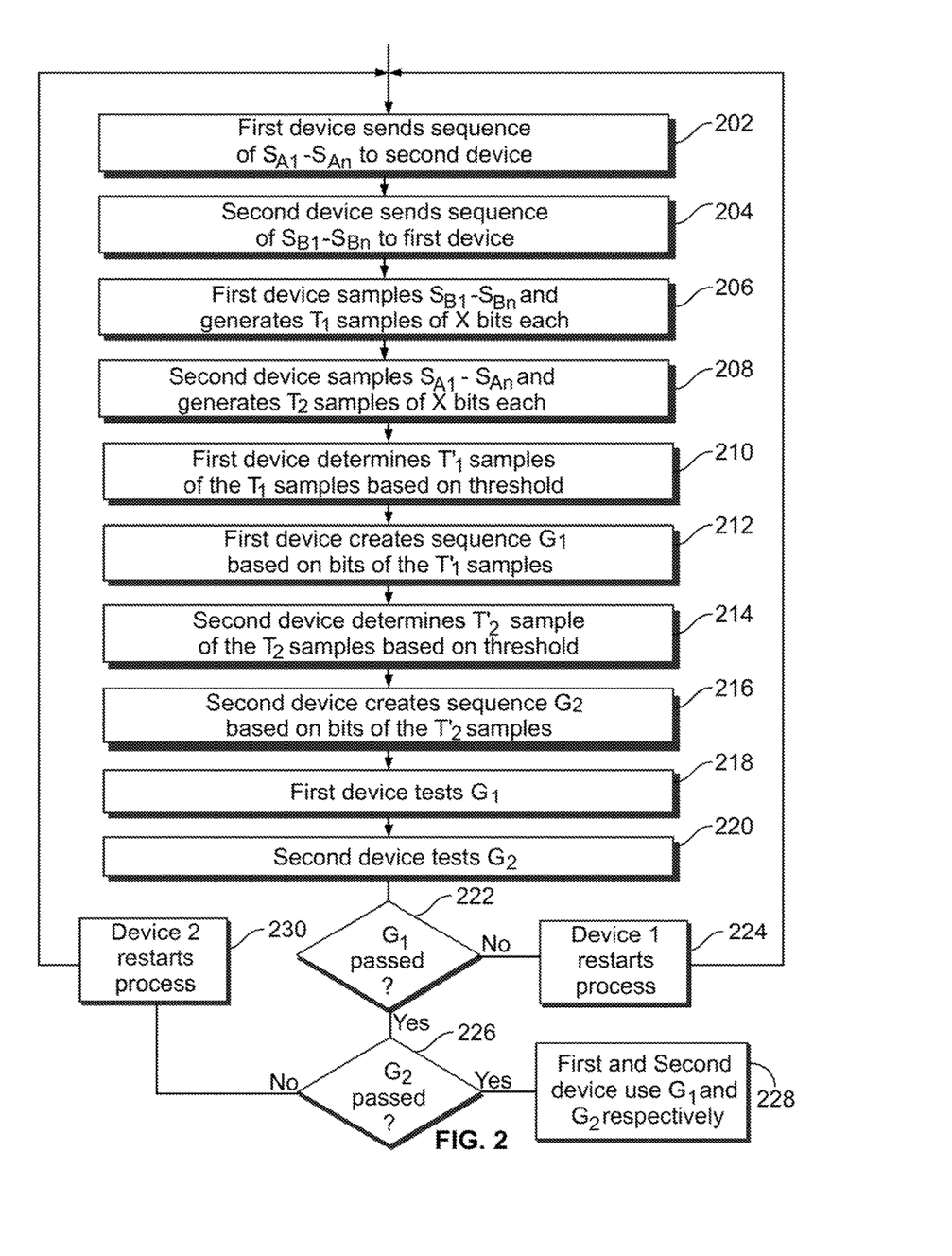
FIG. 2 is a flow diagram illustrating spreading sequence generation operations performed in example communicating devices.

FIG. 2 is a flow diagram illustrating spreading sequence generation operations performed in example communicating devices, such as devices 102 and 104 of FIGS. 1A and 1B. The operations performed in FIG. 2 may be explained using device 102 as the first device and device 104 as the second device of FIG. 2.

The process begins at 202 where device 102 sends a sequence of n RF signals comprising signals $S_{A1}$, $S_{A2}$, ..., $S_{An}$ to device 104 using RF transceiver 121. Signals $S_{A1}$, $S_{A2}$, ..., $S_{An}$ may be sent sequentially in time, and each may be an analog signal such as a sinusoidal signal sent on a frequency of channels 101. The carrier frequency of the signals that make up the sequence of RF signals may each be the same or at different frequencies. The frequencies used depend on the requirements/restrictions of network 100. For example, if only one frequency channel was allowed for communications between devices 102 and 104 that frequency channel would be used. In other implementations, more than one frequency channel may be used. In one implementation, the broadest bandwidth available for the RF signals may be used so that frequency diversity provides statistically independent samples.

The power level P at which device 102 sends signals $S_{A1}$, $S_{A2}$, ..., $S_{An}$ may be determined by power level determiner [119] in device 102. In one implementation, power level determiner [119] may receive location information sent from device 104 on channels 101 through RF transceiver 121 as signal 144. Power level determiner [119] may also receive location information from GPS function 170 on device 102. Power level determiner [119] may then determine P based on the relative locations of devices 102 and 104, and a target received power level at device 104. Power level determiner [119] may then provide the power level P as signal 146 to RF transceiver 121 for use in sending $S_{A1}$, $S_{A2}$, ..., $S_{An}$ to device 104. In one implementation, the target received power level at device 104 may be a predetermined level that is stored in device 102, where the predetermined level is set to allow accurate processing of $S_{A1}$, $S_{A2}$, ..., $S_{An}$ at device 104.

At 204, device 104 sends a sequence of RF signals $S_{B1}$, $S_{B2}$, ..., $S_{Bn}$ to device 102 using RF transceiver 134. The sequence of RF signals $S_{B1}$, $S_{B2}$, ..., $S_{Bn}$ may be a sequence of analog signals identical to signals $S_{A1}$, $S_{A2}$, ..., $S_{An}$ and sent on the same frequencies as $S_{A1}$, $S_{A2}$, ..., $S_{An}$. The power level P at which device 104 sends signals $S_{B1}$, $S_{B2}$, ..., $S_{Bn}$ may be determined by power level determiner 142 based on the same relative locations of devices 102 and 104, and the same target received power level at device 102, as used by power level determiner [119] of device 102. This results in the same power level P being used in both devices 102 and 104.

At 206, device 102 samples the sequence of RF signals $S_{B1}$, $S_{B2}$, ..., $S_{Bn}$. To perform the sampling, RF transceiver [121] provides the received signal $S_{B1}$, $S_{B2}$, ..., $S_{Bn}$ in the order received to sampler 122 as signal 150. Sampler 122 performs sequential sampling on the sequence of signal $S_{B1}$, $S_{B2}$, ..., $S_{Bn}$ to generate sampling results. Sampler 122 may perform the sampling by generating a series of samples, $s_1$, $s_2$, ..., $s_t$ with each sample taken from the RF signal sequence $S_{B1}$, $S_{B2}$, ..., $S_{Bn}$ in the order received and at predetermined time intervals. Each sample $s_1$, $s_2$, ..., $s_t$ may comprise x bits that represent a value of power sampled from one of the signals of the sequence of signals $S_{B1}$, $S_{B2}$, ..., $S_{Bn}$ at the time the sample was taken. For example, if the sampling time intervals are set so that S samples are performed on each separate RF signal in the RF signal sequence and there are n RF signals in the RF signal sequence, there will be a total of (S)(n)=T samples. Each of the T samples may comprise an x-bit value of power.

Next, at 208, device 104 samples the sequence of RF signals $S_{A1}$, $S_{A2}$, ..., $S_{An}$. To perform the sampling, RF transceiver 134 provides the received RF signals $S_{A1}$, $S_{A2}$, ..., $S_{An}$ in the order received to sampler 136 as signal 162. Sampler 122 performs sequential sampling on the sequence of RF signals $S_{A1}$, $S_{A2}$, ..., $S_{An}$ to generate sampling results. Sampler 136 may perform the sampling on RF signals $S_{A1}, S_{A2}, \ldots, S_{An}$ in a manner identical to the manner in which sampler 122 of device 102 performs sampling on RF signals $S_{B1}, S_{B2}, \ldots, S_{Bn}$ to generate T samples, $s'_1, s'_2, \ldots, s'_t$, in device 104.

At 210, device 102 determines $T'_1$ samples from the T sampling results of the sampling performed on RF signals $S_{B1}, S_{B2}, \ldots, S_{Bn}$. In determining the $T'_1$ samples, sampler 122 provides the T sampling results as signal 152 to sequence determiner 124. Sequence determiner 124 may then take $T'_1$ samples from the T samples of $s_1, s_2, \ldots, s_t$, where each of the T' samples indicates a value of power or amplitude above a threshold level. The threshold may be set to the median power level of the T samples calculated over the time period within which the samples are taken. If the power of a sample $s_x$ is below the threshold it may be ignored. If the power of the sample $s_x$ is above the threshold, the bits representing the power sample $S_x$ may be selected as one of the $T'_1$ samples. For example, if the T original samples included samples $s_1, s_2, s_3, s_4, s_5, \ldots, s_t$, where $s_3$ and $s_5$ indicated power levels below the threshold, the $T'_1$ samples selected at 210 would include the samples $s_1, s_2, s_4, \ldots, s_t$.

At 212 the sequence determiner 124 of device 102 then generates the spreading sequence using the $T'_1$ samples. If there are x-bit samples taken at 206, the total bits in the spreading sequence will be $T'_1$ times x bits. The spreading sequence may be generated as a sequence, G1, of the bits from each of the $T'_1$ samples taken in sequence. For example, if the $T'_1$ samples included $s_1=10101$, $s_2=11111$, $s_4=10001, \ldots, s_t=01010$, the spreading sequence G1 would be generated as 1010111111 0001 ... 01010. The spreading sequence G1 may be adjusted for an available bandwidth in the network. For example, G1 may be formed of a number of bits less than the total number of bits in the $T'_1$ samples to conform to an available bandwidth requirement.

At 214, device 104 determines $T'_2$ samples from the T sampling results of the sampling performed on RF signals $S_{A1}, S_{A2}, \ldots, S_{An}$ by sampler 136 at 208. In determining the $T'_2$ samples, sampler 136 provides the T sampling results as signal 164 to sequence determiner 138. Sequence determiner 138 may then take $T'_2$ samples from the T samples of $s'_1, s'_2, \ldots, s'_t$ in the same manner with which sequence determiner 124 determined the $T'_1$ samples from the T samples of $s_1, s_2, \ldots, s_t$ in operation 210.

At 216 the sequence determiner 138 of device 104 then generates the spreading sequence using the $T'_2$ samples. If there are x-bit samples taken at 208, the total bits in the spreading sequence will be $T'_2$ times x bits. The spreading sequence may be generated as a sequence, G2, of the bits from each of the $T'_2$ samples taken in sequence. For example, if the $T'_2$ samples included $s'_1=10101$, $s'_2=1111$, $s'_4=10001, \ldots, s'_t=01010$, the spreading sequence G2 would be generated as 1010111111 0001 ... 01010. The spreading sequence G2 may be adjusted for an available bandwidth in the network. For example, G2 may be formed of a number of bits less than the total number of bits in the $T'_2$ samples to conform to an available bandwidth requirement.

At 218, device 102 tests G1 for conformance to metrics. Sequence determiner 124 may provide sequence G1 to sequence tester 126 as signal 154. Sequence tester 126 may then test G1 for randomness by conventional methods used to test bit string randomness. For example, a test based on determining the number of different m-bit patterns that appear in the sequence G1, for a fixed value m may be used. When less than a selected number of distinct m-bit patterns are found along the sequence, the sequence G1 may be rejected for lack of randomness. When more than a selected number of different patterns appear in the sequence, the sequence G1 may pass the randomness test.

At 220, device 104 tests G2 for conformance to metrics. Sequence determiner 138 may provide sequence G2 to sequence tester 140 as signal 169. Sequence tester 140 may then test G2 for randomness by the same method used by sequence tester 126 to test G1 in device 102.

At 222, sequence tester 126 in device 102 determines if G1 passed randomness testing at 218. If G1 passed randomness testing the process moves to 226. If G1 did not pass randomness testing, the process moves to 224. At 224, device 102 restarts the process of FIG. 2 over again and moves to 202. The restarting of the process at 224 may include sending appropriate signals to device 104 that device 104 should also restart the process of sequence generation over again by returning to 202. Both of devices 102 and 104 will then repeat operations 202-220 to generate new sequences G1 and G2.

If G1 passed randomness testing and the process moves to 226, sequence tester 140 in device 104 determines if G2 passed randomness testing at 220. If G2 passed randomness testing the process moves to 228. If G2 did not pass randomness testing the process moves to 230. At 230, device 104 restarts the process of FIG. 2 over again and moves to 202. The restarting of the process at 230 may include sending appropriate signals to device 102 that device 102 should also restart the process of sequence generation over again by returning to 202. Both of devices 102 and 104 will then repeat operations 202-220 to generate new sequences G1 and G2.

If both G1 and G2 pass randomness testing in devices 102 and 104, respectively, the process moves to 228. At 228, device 102 may process data signals using G1 as a spread spectrum code for communications with device 104, and device 104 may process data signals using G2 as a spread spectrum code for communications with device 102. Because identical operations were used in each of device 102 and 104 to generate G1 and G2, respectively, the sequences G1 and G2 are identical, or nearly identical. The processing of data signals may include spreading data signals for spread spectrum transmission, and also include the de-spreading of spread spectrum data signals that have been received.

In various implementations, the use of G1 and G2 as a spread spectrum code at 228 may include using G1 and G2 for directly spreading and/or de-spreading a data signal using direct-sequence spread spectrum (DSSS) techniques. In another example, sets of bits of the sequence G1 and G2 may be used to generate a second sequence comprising a frequency hopping channel list, respectively, in device 102 and 104 that is used to implement frequency-hopping spread spectrum (FHSS). Other example implementations may include using the sequences G1 and G2 in time-hopping spread spectrum (THSS), or ultra-wideband (UWB) spread spectrum.

In implementations of the process of FIG. 2 in various networks, the various parameters related to the spreading sequence generation may be set according to network constraints and network configuration. For example, the frequencies used for exchange of the sequences of the RF signals will depend on the network frequencies that the devices are allowed to use. Also, the number of RF signals in the sequence of RF signals, the rate of the sampling performed on the RF signals, the number of bits per sample, and the number of bits in the generated spreading sequence may each be adapted to provide spreading sequences appropriate for use in a particular network.

In one implementation, devices 102 and 104 may receive an indication of available network bandwidth from a network controller and use the indication in creating the sequences G1 and G2. For example, in the implementation of FIGS. 1A and 1B, a controller of network 100 may send an indication of available bandwidth to device 104. Device 104 may then send the indication to device 102. Both of devices 102 and 104 may then set the number of RF signals in the sequence of RF signals, the rate of the sampling performed on the RF signals, the number of bits per sample, and/or the number of bits in the generated spreading sequence to values associated with the available bandwidth. Each of device 102 and 104 may have a sequence generation database that may include values of the number of RF signals in the sequence of RF signals, the rate of the sampling performed on the RF signals, the number of bits per sample, and/or the number of bits in the generated spreading sequence associated with each of a plurality of available bandwidths or bandwidth ranges. The plurality of available bandwidths or bandwidth ranges may also each be divided into subcategories associated with a desired spreading gain factor in the sequence generation database.

When devices 102 and 104 receive an indication that the available bandwidth is of a selected amount, that selected amount may be used in conjunction with the sequence generation database in each device to configure portions 105 and 107, respectively, of devices 102 and 104 to perform the process of FIG. 2 to generate G1 and G2 of appropriate length for the available bandwidth and desired spreading gain factor. As available bandwidth changes, the network may send an updated indication of available bandwidth to devices 102 and 104, and each of the devices may generate an updated spreading sequence. In this implementation, after devices 102 and 104 use the threshold value to determine the $T'_1$ and $T'_2$ samples, G1 and G2 may be created from a selected number of samples of the $T'_1$ and $T'_2$ samples, respectively, where the selected number provides a spreading sequence of length (number of bits) for the available bandwidth. In this case, the number of RF signals in the sequence of RF signals, the rate of the sampling performed on the RF signals, and the number of bits per sample, may be set in each device so that the likelihood of the $T'_1$ or $T'_2$ samples including enough bits (after the threshold power level is applied) to generate G1 and G2 of an appropriate length is maximized. Each of devices 102 and 104 may then create G1 and G2, respectively, based on the $T'_1$ or $T'_2$ samples in an identical way.

In another implementation in which devices 102 and 104 include transceivers that capable of signal transmission at precise power levels and are also capable of precise measurement of received signals, the sequences in both devices will have a high probability of being identical. In this situation, an implementation may be used in which G1 and G2 may be created directly from the $T'_1$ and $T'_2$ sampling results, respectively, by using all x bits of each of the samples. In another implementation where devices 102 and 104 include lower quality transceivers that are not capable of transmitting signals at precise power levels and/or are not capable of precise measurement of received signals, the sequences G1 and G2 created in device 102 and 104, respectively, may have a lower probability of being identical. In this type of situation, an implementation may be used in which G1 and G2 are created using only a subset of most significant bits from each of the $T'_1$ and $T'_2$ sampling results, respectively, to provide a more robust spread spectrum sequence creation process. Use of a subset of the most significant bits from each of the sampling results allows errors that occur in the less important bits of the sampling results to be removed and not cause differences between G1 and G2.

Also, in another implementation, one or more of the sequences of one or more RF signals may be sent using channels offset from one another. For example, one or more of the signals sent in the direction from device 102 to device 104 (i.e., $S_{A1}, S_{A2}, \ldots, S_{An}$), and one or more of the signals sent in the direction from device 104 to device 102 (i.e., $S_{B1}, S_{B2}, \ldots, S_{Bn}$), may be sent on one or more frequency channels that are offset from the center frequency of channel 101. The amount of frequency offset may be chosen so that the reciprocity of the channel characteristics still allows generation of identical, or nearly identical, sequences. For example, if one frequency channel is assigned for communications between device 102 and 104, the offset may be a frequency offset of several percent of the center frequency of the assigned channel.

Figure 3:
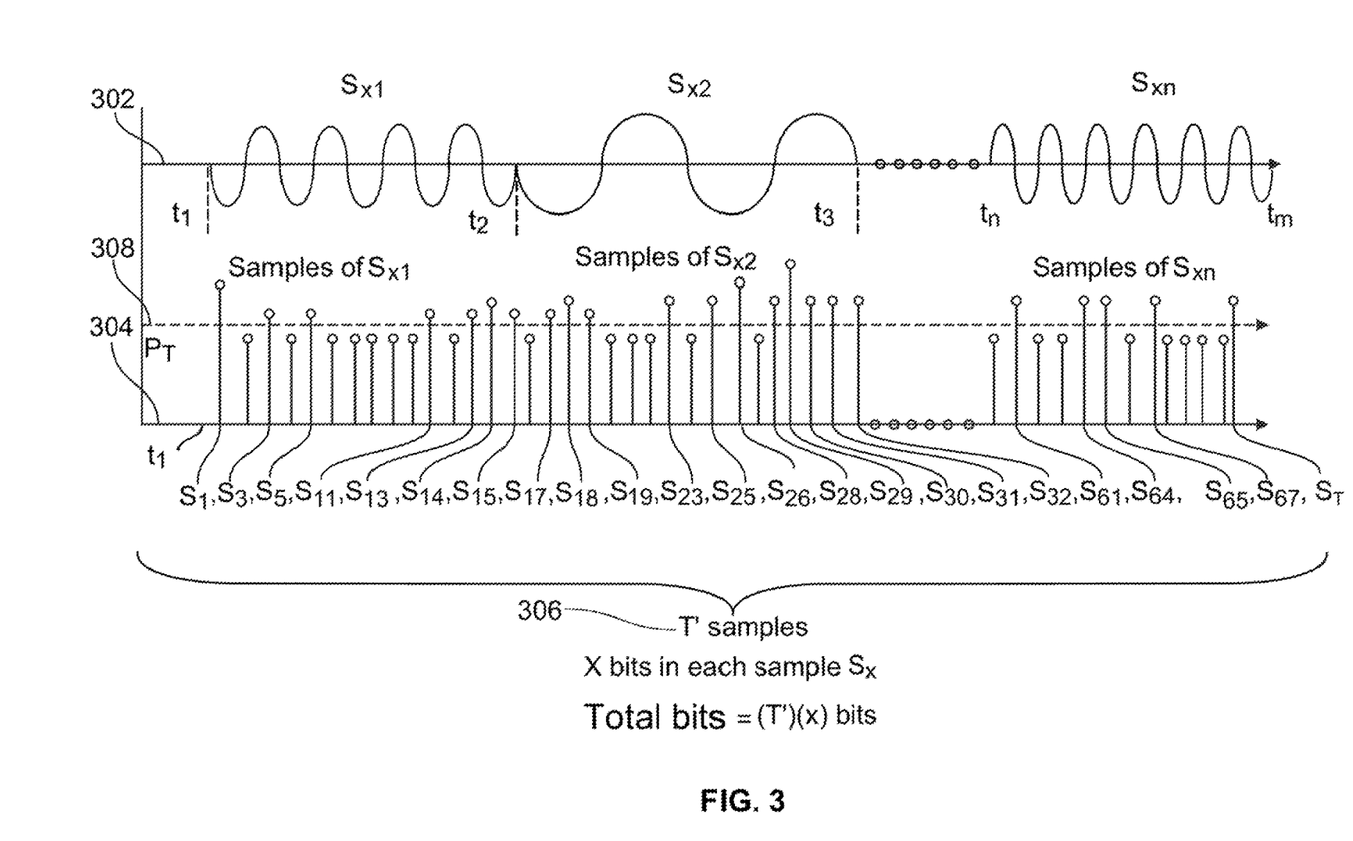
FIG. 3 is a diagram illustrating example sampling operations for spreading sequence generation.

FIG. 3 is a diagram illustrating example sampling operations for spreading sequence generation as performed in the process of FIG. 2. FIG. 3 shows a sequence of RF signals $S_{X1}, S_{X2}, \ldots, S_{Xn}$, which may represent examples of RF signals $S_{A1}, S_{A2}, \ldots, S_{An}$ and RF signals $S_{B1}, S_{B2}, \ldots, S_{Bn}$ of FIG. 2. RF signals $S_{X1}, S_{X2}, \ldots, S_{Xn}$ are shown on time axis 302 as a sequence of signals. $S_{X1}$ is sent between time t1 and t2, $S_{X2}$ is sent between time t2 and t3, and $S_{Xn}$ is sent between time tn and tm. The RF signals $S_{X1}, S_{X2} \ldots S_{Xn}$, may be sent on the same or on different carrier frequencies within the frequency band of network 100.

In the sampling operation, samples are taken of the RF signals $S_{X1}, S_{X2} \ldots S_{Xn}$ at time intervals as shown on time axis 304. The sampling rate may be set to generate a series of samples $s_1, s_2, \ldots, s_T$ across the complete sequence of RF signals $S_{X1}, S_{X2} \ldots S_{Xn}$. Each of these samples $s_1, s_2, \ldots, s_T$ is shown along axis 304 as a vertical line having a height that indicates a magnitude of a sampled power level. The samples on axis 304 may represent examples of the $T_1$ samples $s_1, s_2, \ldots, s_t$ taken from signals $S_{B1}, S_{B2}, \ldots, S_{Bn}$ in operation 206 of FIG. 2. The samples may also represent the $T_2$ samples $s'_1, s'_2, \ldots, s'_t$ taken from signals $S_{A1}, S_{A2}, \ldots, S_{An}$ in operation 208 of FIG. 2.

A threshold power level $P_T$ 308 is also shown along axis 304. The threshold $P_T$ 308 is used to generate a spreading sequence GX by taking samples of $s_1, s_2, \ldots, s_t$ that have a magnitude greater than $P_T$ 308 to generate T' samples. In the example of FIG. 3, samples $s_2, s_4, s_7, s_8, s_9, s_{10}$ among others, are shown as being dropped, while samples $s_1, s_3, s_5, s_{11}$, among others, are selected to generate the T' samples 306. These samples may represent examples of the $T'_1$ samples generated in 210 of FIG. 2. The samples may also represent examples of the $T'_2$ samples generated in 214 of FIG. 2. The total number of bits in the T' samples 306 is (T')(x) bits, where x equals the number of bits in each sample. The T' samples may then be used to form GX, for example as described for G1 in operation 212 and for G2 for operation 216 of FIG. 2. The spreading sequence GX may contain up to the complete set of T' samples 306 selected by using the threshold. The number of bits taken from the T' samples to form GX may depend on the available bandwidth in the network.

Figure 4:
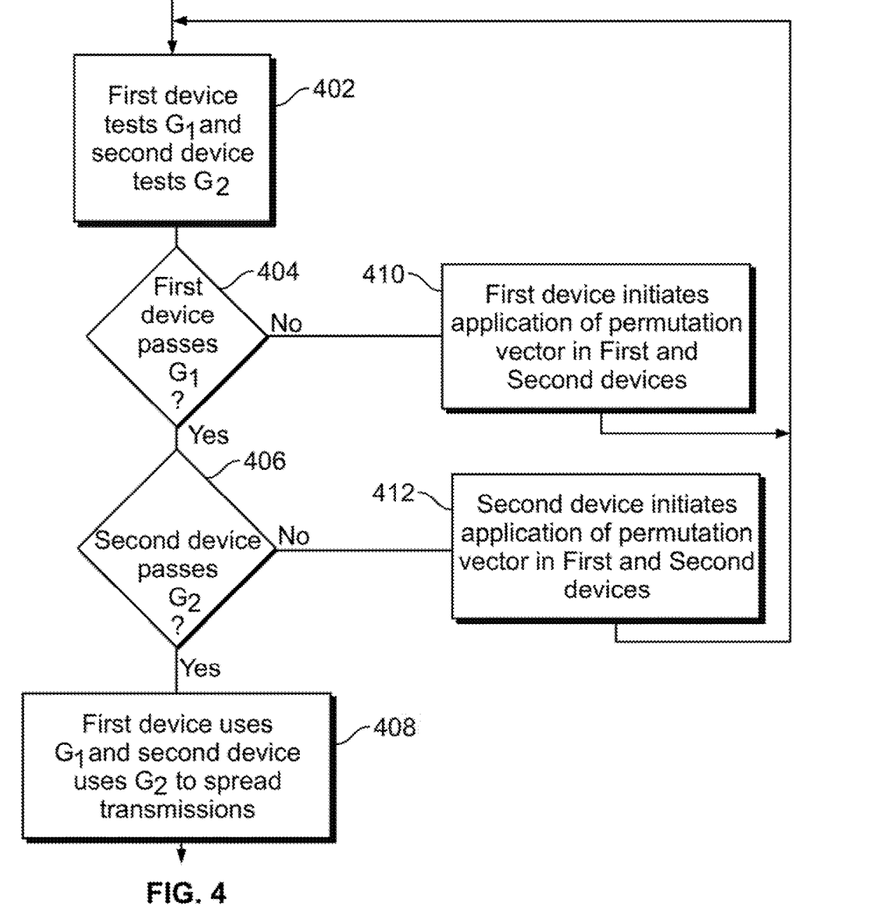
FIG. 4 is a flow diagram illustrating example spreading sequence generation operations.

FIG. 4 is a flow diagram illustrating example spreading sequence generation operations that may be used in an alternative implementation of FIG. 2. FIG. 4 shows an implementation in which a permutation vector is applied to the sequences G1 and G2 to generate a new G1 and G2 if either G1 or G2 does not pass the testing for conformance to metrics. This may be the testing, for example, as performed at 218 and 220 of FIG. 2. In the implementation of FIG. 4, instead of restarting the process, the sequence testers 126 and 140 attempt to generate new sequences that pass testing by permuting the already generated sequences G1 and G2. The process of FIG. 4 may be explained with reference to FIG. 2, and with operations 402-412 of FIG. 4 replacing operations 218-230 of FIG. 2.

The process begins at 402 where device 102 tests G1 for conformance to randomness metrics. Sequence determiner 124 may provide sequence G1 to sequence tester 126 as signal 154. Sequence tester 126 may then test G1 for randomness by conventional methods used to test bit string randomness. In one implementation, a test based on determining the number of different m-bit patterns that appear in the sequence G1, for a fixed value m may be used. When less than a selected number of distinct m-bit patterns are found along the sequence, the sequence G1 may be rejected for lack of randomness. When more than a selected number of different patterns appear in the sequence, the sequence G1 may pass the randomness test. Also at 402, device 104 tests G2 for conformance to the randomness metrics. Sequence determiner 138 may provide sequence G2 to sequence tester 140 as signal 169. Sequence tester 140 may then test G2 for randomness by the same method used by sequence tester 126 to test G1 in device 102.

Next, at 404, sequence tester 126 determines if G1 passed the testing. If sequence tester 126 determines that G1 does not pass the testing, the process moves to 410. At 410, device 102 initiates application of a permutation vector to G. Device 102 also sends appropriate signals to device 104 indicating to device 104 that device 104 should initiate application of the same permutation vector to G2. At device 102, sequence tester 126 applies the permutation vector to G1 to generate a new version of G1. Sequence tester 126 may then return to 404 and retest the new G1 for conformance to the randomness metrics. At device 104, sequence tester 140 applies the same permutation vector to G2 to generate a new version of G2. Sequence tester 140 may then also return to 402 and retest the new G2 for conformance to the randomness metrics. The process of FIG. 4 is then repeated.

If however, at 404, G1 passed the testing the process moves to 406 where sequence tester 140 determines if G2 passed the testing. If sequence tester 140 determines that G2 does not pass the testing, the process moves to 412. At 412, device 104 initiates application of a permutation vector to G2. Device 104 also sends appropriate signals to device 102 indicating to device 102 that device 102 should initiate application of the same permutation vector to G1. At device 104, sequence tester 140 applies the permutation vector to G2 to generate a new version of G2. Sequence tester 140 may then return to 404 and retest the new G2 for conformance to the randomness metrics. At device 102, sequence tester 126 also applies the same permutation vector to G1 to generate a new version of G1. Sequence tester 126 may then also return to 402 and retest the new G1 for conformance to the randomness metrics. The process of FIG. 4 is then repeated.

If however, at 404, G2 passed the testing the process moves to 408. When the process moves to 408 both G1 and G2 have passed the testing. At 408, sequence tester 126 provides G1 to device 102 as signal 156 and device 102 uses G1 to process spread spectrum data signals exchange with device 104. Also, sequence tester 140 provides G2 to device 104 as signal 168 and device 104 uses G2 to process spread spectrum data signals exchanged with device 102.

Figure 5:
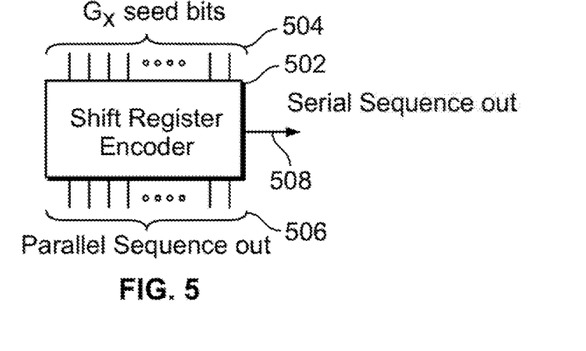
FIG. 5 is a simplified block diagram illustrating example spreading sequence generation using a shift register encoder.

FIG. 5 is a simplified block diagram illustrating example spreading sequence generation using a shift register encoder 502. The method shown in FIG. 5 may be use in implementations in which a generated first sequence, for example GX 306 of FIG. 3, is further processed to generate a second sequence that is used as the actual spreading sequence rather than using the bits of GX directly. In FIG. 5, selected bits of the sequence GX are input into shift register encoder as seed bits 504. The shift register encoder may then be cycled a select number of cycles to generate a spreading sequence that may be taken from the parallel sequence output 506, or cycled out of the serial sequence output 508. The implementation of FIG. 5 may be used in alternative embodiments of FIG. 2. For example, the implementation may be used as part of operations 212 and 216 in devices 102 and 104, respectively, using identical shift register encoder parameters to generate the final spreading sequences that are tested at operations 218 and 220. In other implementations, other types of functions may be used as part of operations 212 and 216 to generate a final spreading sequence by further processing the generated sequences.

Figures 6, 7:
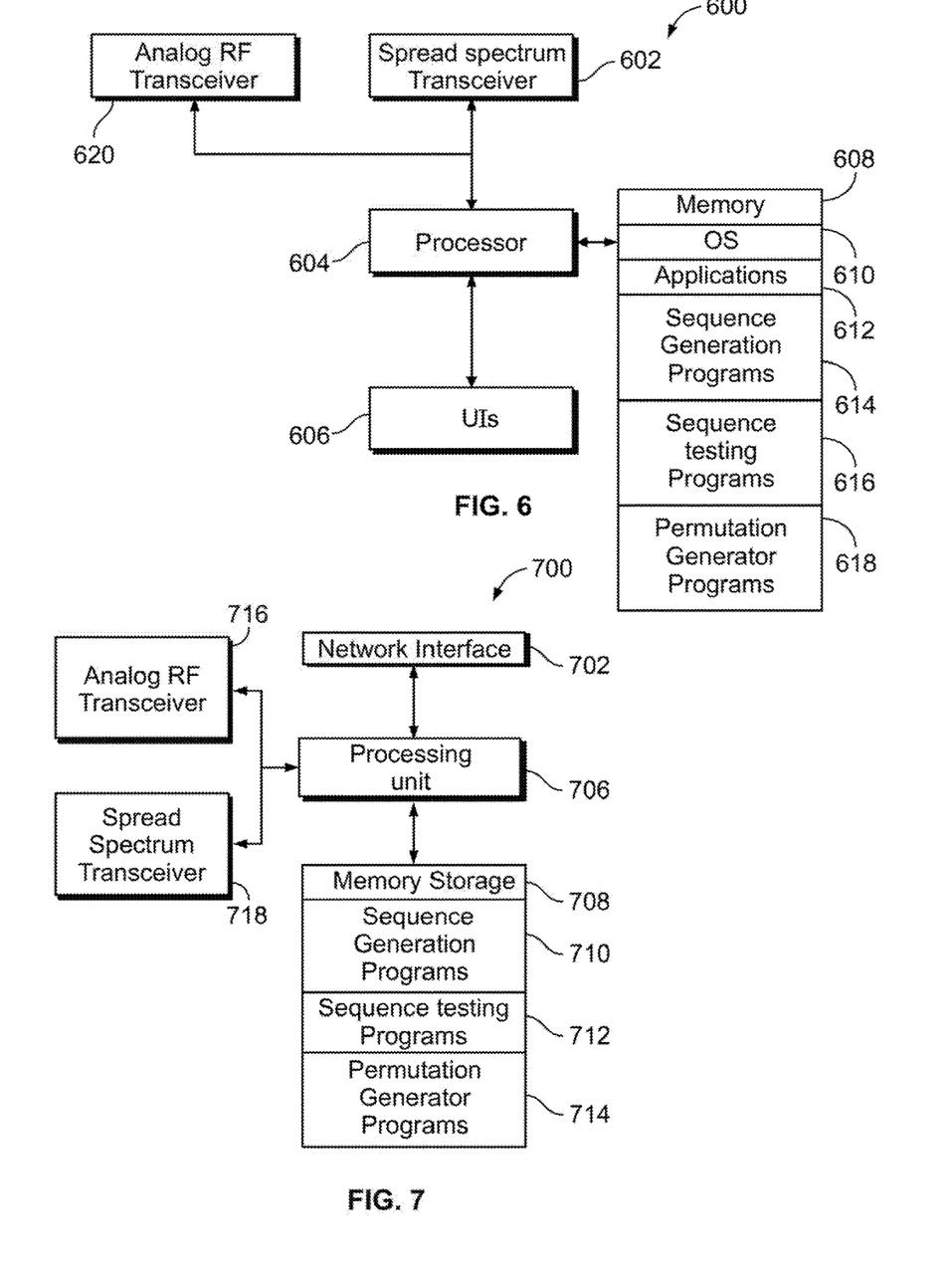
FIG. 6 illustrates an example device implemented as a mobile device.
FIG. 7 illustrates as example device implemented as a network device.

FIG. 6 is a simplified block diagram of an example device 600. The functions of device 102 of FIG. 1B may be implemented on a device such as device 600. In an example implementation, device 600 may be a mobile device. Device 600 may include a processor 604, memory 608, user interfaces (UIs) 606, a spread spectrum transceiver 602, and analog RF transceiver 620. Memory 608 may be implemented as any type of computer readable storage media, including non-volatile and volatile memory. Memory 608 is shown as including code comprising device operating system (OS) 610, device applications 612, sequence generation programs 614, sequence testing programs 616, and permutation generator programs 618. Processor 604 may comprise one or more processors, or other control circuitry, or any combination of processors and control circuitry. The sequence generation programs 614, sequence testing programs 616, and permutation generator programs 618 may provide the functions shown in device 102 in FIG. 1B. When executed, the sequence generation programs 614, sequence testing programs 616, and permutation generator programs 618 may cause processor 604 to control device 600 to perform processes described in relation to FIG. 2 and FIG. 4.

User interfaces 606 may include any type of interface such as a touchscreen, a key pad, a voice controlled interface, interfaces that are gesture or motion based, an interface that receives input wirelessly, or any other type of interface that allows a user and/or network manager to provide appropriate control of device 600 for performing the operations of the embodiments.

In example implementations, device 600 may be any type of device that may be configured to communicate using spread spectrum for data communications. For example, device 600 may be implemented in a smart phone, a tablet computer, a desktop computer, laptop computer device, gaming devices, media devices, smart televisions, multimedia cable/television boxes, smart phone accessory devices, tablet accessory devices, or personal digital assistants (PDAs). In an implementation, device 600 may operate according to half-duplexed communications standard. For example, device 600 may operate using half-duplex channels according to the IEEE 802.11 standards.

FIG. 7 is a simplified block diagram of another example device 700. Device 700 may be implemented, for example, as device 104 in the network 100 of FIG. 1A. In one implementation device 700 may be an access point operating according to the IEEE 802.11 standards. Device 700 includes processing unit 706, analog RF transceiver 716, spread spectrum transceiver 718, and memory/storage 708 that includes code comprising sequence generation programs 710, sequence testing programs 712, and permutation generator programs 714. The sequence generation programs 710, sequence testing programs 712, and permutation generator programs 714 may provide the functions shown in device 104 in FIG. 1B. When executed, sequence generation programs 710, sequence testing programs 712, and permutation generator programs 714 may cause processor 706 to control device 700 to perform processes described in relation to FIG. 2 and FIG. 4.

Memory 708 may be implemented as any type of computer readable storage media, including non-volatile and volatile memory. Access point 700 connects to a network, such as the internet, over network interface 702. Processing unit 706 may comprise one or more processors, or other control circuitry or any combination of processors and control circuitry that provide overall control of the access point according to the disclosed embodiments. Analog RF transceiver 716 and spread spectrum transceiver 718 provide the capability for device 700 to communicate with devices, for example device 102 of FIG. 1B, over channels 101, such as RF channels configured according to the Wi-Fi standards.

The example embodiments disclosed herein may be described in the general context of processor-executable code or instructions stored on memory that may comprise one or more computer readable storage media (e.g., tangible non-transitory computer-readable storage media such as memory 608 or 708). As should be readily understood, the terms "computer-readable storage media" or "non-transitory computer-readable media" include the media for storing of data, code and program instructions, such as memory 608, 708, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

The disclosed embodiments include a first device comprising one or more processors and memory in communication with the one or more processors, the memory comprising code that, when executed, causes the one or more processors to control the first device to receive one or more RF signals from a second device, sample each signal of the one or more RF signals and generate sampling results, create a sequence based on the sampling results, and, process a data signal using the sequence as a spread spectrum code for communications with the second device. The data signal may comprise a spread spectrum signal received from the second device and the first device may process the spread spectrum signal by decoding the spread spectrum signal using the sequence. The data signal may be generated at the first device and the first device may process the data signal by spreading the data signal with the sequence to generate a spread spectrum signal, and sending the spread spectrum signal to the second device. The sequence of one or more signals may comprise a first one or more RF signals, and the code may cause the one or more processors to control the first device to send a second one or more RF signals to the second device. The code may further cause the one or more processors to control the first device to test the sequence for conformance to at least one metric before using the sequence to process the data signal. The at least one metric may comprise a randomness metric. The code may further cause, if the sequence does not conform to the at least one metric, the one or more processors to control the first device to apply a permutation vector to the sequence, and retest the sequence for conformance to at least one metric before using the sequence to process the data signal.

The code further may cause the one or more processors to control the first device to sample each signal of the one or more RF signals and generate sampling results by sampling each signal of the one or more RF signals at time intervals to generate a plurality of sets of bits, wherein each of the plurality of sets of bits indicates a magnitude of a sampled level, and, create the sequence based on the sampling results by using selected sets of the plurality of sets of bits having a magnitude above a threshold level. The code may further cause the one or more processors to control the first device to determine the threshold level by determining the median of the magnitudes indicated by each of plurality of the sets of bits. The sequence may comprise a second sequence, and the code may further causes the one or more processors to control the first device to sample each signal of the one or more RF signals and generate sampling results by sampling each signal of the one or more RF signals at time intervals to generate a plurality of sets of bits, wherein each of the sets of bits indicates a magnitude of a sampled level, create a first sequence based on the sampling results by using selected sets of the plurality of sets of bits having a magnitude above a threshold level, and, create the second sequence by inputting the selected sets of the plurality of sets of bits into a encoder to generate the second sequence. The first device may create the sequence based on the sampling results by determining an available bandwidth, determining a length for the sequence based on the available bandwidth, and creating the sequence based on the sampling results, wherein the sequence is of the determined length.

The disclosed embodiments also included a method comprising receiving, at a first device, one or more RF signals from a second device, sampling each signal of the one or more RF signals and generating sampling results, creating a sequence based on the sampling results, and, processing a data signal device using the sequence as a spread spectrum code for communications with the second device. The data signal may comprise a spread spectrum signal received from the second device, and the processing may comprises decoding the spread spectrum data signal using the sequence. The data signal may be generated at the first device, and the processing may comprise spreading the data signal with the sequence to generate a spread spectrum data signal and sending the spread spectrum data signal to the second device. The one or more RF signals may comprises a first one or more RF signals, and the method may further comprise sending a second one or more RF signals to the second device. The sampling each signal of the one or more RF signals and generating sampling results may further comprise sampling each signal of the one or more RF signals and generating sampling results by sampling each signal of the one or more RF signals at time intervals to generate a plurality of sets of bits, wherein each of the plurality of sets of bits indicates a magnitude of a sampled level, and creating the sequence based on the sampling results by using selected sets of the plurality of sets of bits having a magnitude above a threshold level. The threshold level may be determined by determining the median of the magnitudes indicated by each of plurality of the sets of bits. The testing may comprises testing the sequence for conformance to at least one metric before processing the data signal using the sequence.

The disclosed embodiments also included a system comprising a first device and a second device configured to communicate with one another, wherein the first device receives a first sequence of RF signals from the second device, and the second device receives a second sequence of RF signals from the first device, and, wherein the first device samples the first sequence of RF signals and creates a first sequence and the second device samples the second sequence of RF signals and creates a second sequence, and the first device spreads and de-spreads data signals communicated between the first and second device using the first sequence, and the second device spreads and de-spreads the data signals communicated between the first and second device using the second sequence. The first device may sample the first sequence of signals at each of a plurality of time intervals to generate a first plurality of sets of bits, each set of the first plurality of sets of bits indicating a magnitude sampled at the first device, and the second device may sample the second sequence of signals at each of the plurality of time intervals to generate second plurality of sets of bits, each set of the second plurality of sets of bits indicating a magnitude sampled at the second device, and, the first and second devices create the first and second sequences using, respectively, first selected sets of bits of the first plurality of sets of bits and second selected sets of bits of the second plurality of sets of bits that indicate a magnitude, respectively, above a first and second threshold level. The first device may determine the first threshold level by determining the median magnitude indicated by each of the first plurality of sets of bits, and the second device may determine the second threshold level by determining the median magnitude indicated by each of the second plurality of sets of bits. The lengths of the first sequence of bits and second sequence of bits may be based on a bandwidth available for communications between the first and second devices.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A first device comprising:
   one or more processors; and,
   memory in communication with the one or more processors, the memory comprising code that, when executed, causes the one or more processors to control the first device to:
   receive one or more signals from a second device;
   sample each signal of the one or more signals and generate sampling results by sampling each signal of the one or more signals at time intervals to generate a plurality of sets of bits, wherein each of the plurality of sets of bits indicates a magnitude of a sampled level;
   create a sequence based on the sampling results by using selected sets of the plurality of sets of bits having a magnitude above a threshold level; and,
   use the sequence to process a data signal generated at the first device for spread spectrum transmissions transmitted to the second device.

2. The first device of claim 1, wherein the data signal comprises a first data signal and the code further causes the one or more processors to control the first device to:
   receive a spread spectrum transmission from the second device; and, processes the spread spectrum transmission received from the second device using the sequence to determine a second data signal generated at the second device.

3. The first device of claim 1, wherein the first device uses the sequence to process the data signal by spreading the data signal with the sequence to generate a spread spectrum signal.

4. The first device of claim 1, wherein the one or more signals comprises a first one or more signals, and the code causes the one or more processors to control the first device to send a second one or more signals to the second device.

5. The first device of claim 1, wherein the code further causes the one or more processors to control the first device to test the sequence for conformance to at least one metric before using the sequence to process the data signal.

6. The first device of claim 5, wherein the at least one metric comprises a randomness metric.

7. The first device of claim 5, wherein if the sequence does not conform to the at least one metric, the code further causes the one or more processors to control the first device to apply a permutation vector to the sequence, and retest the sequence for conformance to the at least one metric before using the sequence to process the data signal.

8. The first device of claim 1, wherein the code further causes the one or more processors to control the first device to determine the threshold level by determining the median of the magnitudes indicated by each of the plurality of the sets of bits.

9. The first device of claim 1, wherein the sequence comprises a second sequence, and the code further causes the one or more processors to control the first device to create the second sequence:

create a first sequence based on the sampling results by using selected sets of the plurality of sets of bits having a magnitude above a threshold level; and, create the second sequence by inputting the selected sets of the plurality of sets of bits into an encoder to generate the second sequence.

10. The first device of claim 1, wherein the first device creates the sequence based on the sampling results by:

determining an available bandwidth;

determining a length for the sequence based on the available bandwidth; and creating the sequence based on the sampling results, wherein the sequence is of the determined length.

11. A method comprising:

receiving, at a first device, one or more signals from a second device;

sampling each signal of the one or more signals and generating sampling results by sampling each signal of the one or more signals at time intervals to generate a plurality of sets of bits, wherein each of the plurality of sets of bits indicates a magnitude of a sampled level;

creating a sequence based on the sampling results by using selected sets of the plurality of sets of bits having a magnitude above a threshold level; and, using the sequence to process a data signal generated at the first device for spread spectrum transmissions transmitted to the second device.

12. The method of claim 11, wherein the data signal comprises a first data signal and the method further comprises:

receiving a spread spectrum transmission from the second device; and, processing the spread spectrum transmission received from the second device using the sequence to determine a second data signal generated at the second device.

13. The method of claim 11, wherein the processing comprises spreading the data signal with the sequence to generate a spread spectrum data signal.

14. The method claim 11, wherein the one or more signals comprises a first one or more signals, and the method further comprises sending a second one or more signals to the second device.

15. The method of claim 11, further comprising:

determining the threshold level by determining the median of the magnitudes indicated by each of the plurality of the sets of bits.

16. The method of claim 11, further comprising testing the sequence for conformance to at least one metric before processing the data signal using the sequence.

17. A system comprising:

a first device and a second device configured to communicate with one another, wherein the first device receives a first sequence of signals from the second device, and the second device receives a second sequence of signals from the first device, wherein the first device samples the first sequence of signals at each of a plurality of time intervals to generate a first plurality of sets of bits, each set of the first plurality of sets of bits indicating a magnitude sampled at the first device, and the second device samples the second sequence of signals at each of the plurality of time intervals to generate a second plurality of sets of bits, each set of the second plurality of sets of bits indicating a magnitude sampled at the second device, and the first and second devices create a first and second sequence of bits, respectively, using first selected sets of bits of the first plurality of sets of bits and second selected sets of bits of the second plurality of sets of bits that indicate a magnitude above a first and second threshold level, respectively, and, the first device spreads and de-spreads data signals communicated between the first and second device using the first sequence of bits, and the second device spreads and de-spreads the data signals communicated between the first and second device using the second sequence of bits.

18. The system of claim 17, wherein the lengths of the first sequence of bits and second sequence of bits are based on a bandwidth available for communications between the first and second devices.

* * * * *